United States Patent
Ogane et al.

(10) Patent No.: US 8,603,382 B2
(45) Date of Patent: Dec. 10, 2013

(54) PLASTICS MOLDING SYSTEM AND OPTICAL ELEMENT FORMED BY THE SAME

(75) Inventors: Masanobu Ogane, Yokohama (JP); Atsushi Takata, Yokohama (JP)

(73) Assignee: Canon Kasbushiki Kaisha, Tokyo (JP)

(*) Notice: Subject to any disclaimer, the term of this patent is extended or adjusted under 35 U.S.C. 154(b) by 100 days.

(21) Appl. No.: 13/044,755

(22) Filed: Mar. 10, 2011

(65) Prior Publication Data
US 2011/0233800 A1    Sep. 29, 2011

(30) Foreign Application Priority Data
Mar. 23, 2010 (JP) ................ 2010-065806

(51) Int. Cl.
*B28B 5/00* (2006.01)

(52) U.S. Cl.
USPC .................................... 264/297.2

(58) Field of Classification Search
USPC .................................... 264/297.2
See application file for complete search history.

(56) References Cited

U.S. PATENT DOCUMENTS
5,746,961 A    5/1998    Stevenson et al.

FOREIGN PATENT DOCUMENTS

| CN | 1891431 A | 1/2007 |
|----|-----------|--------|
| CN | 101041258 A | 9/2007 |
| JP | 05-124078 A | 5/1993 |
| JP | 2008221501 A | 9/2008 |

*Primary Examiner* — Larry Thrower
(74) *Attorney, Agent, or Firm* — Canon USA Inc. IP Division

(57) ABSTRACT

A molding method of a plastic molded product includes preparing at least one mold including a high-precision surface; preparing a plurality of molds having a low-precision surface; sequentially supplying molten resin to one of the plurality of molds having low-precision surface; sequentially cooling, for a predetermined length of time, the molds supplied with the molten resin while applying pressure, taking out a molded member from the cooled mold, setting the molded member which has been taken out in the mold having the high-precision surface, and melting only a surface of the molded member while pressing the high-precision surface against the surface to form a plastic molded product.

5 Claims, 8 Drawing Sheets

PLASTICS MOLDING SYSTEM AND OPTICAL ELEMENT FORMED BY THE SAME

BACKGROUND OF THE INVENTION

1. Field of the Invention

The present invention relates to a plastics molding system and an optical element formed by the plastics molding system. More particularly, the present invention relates to a plastics injection molding system using a plurality of molds, which is so-called a rotary molding system. According to the rotary molding system, the site where the molds are cooled is different from where the injection filling is performed.

2. Description of the Related Art

When a plastic product is formed by injection molding, normally, after a mold is set on an injection molding machine, a heated and molten resin is injected into the mold. When the resin is cured by cooling, the cured resin is taken out from the mold. Then, the next molten resin is injected into the empty mold. This processing is repeated.

However, according to a molding using such processing, it is necessary to take long cooling time when molding thick products or high precision products used, for example, in optical systems such as plastic lenses, prisms, and mirrors. While the resin is cured, which takes long time, the mold cannot be used. Thus, the injection molding machine cannot be used for the injection of the next resin while the injected resin is being cured. For this reason, the usage ratio of the injection molding machine is not good and productivity is not increased.

To alleviate the above-discussed limitations, a plastics injection molding system referred to as a rotary molding system has been proposed, for example, in Japanese Patent Application Laid-Open No. 05-124078 (JP 05-124078). According to the system described in JP 05-124078, a plurality of molds is prepared and the molds are sequentially loaded onto an injection molding machine, so that molten resin is successively injected into the molds one at a time. When molten resin is injected into a first mold, the first mold filled with the resin is moved to another place and cooled. Immediately after the first mold filled with the resin is moved to another place, molten resin is injected into the next mold loaded on the injection molding machine. When the first mold filled with resin has cooled, the molded form is extracted. Each process of heating and injecting the resin into a mold, and cooling and extracting the molded form is repeated at a specified processing time known as the "takt time".

In the following description, a plastics molding system that performs the injection filling processing and the cooling processing at different sites from each other using a plurality of molds, such as the system described above, is referred to as a rotary molding system.

In recent years, with advance in image quality of digital copying machine and printers, precision at a higher level has been required for optical elements. Under such circumstances, demands for not only optical elements of high precision shapes but also elements of higher optical characteristics regarding, for example, birefringence and refractive index distribution has been increasing. The rotary molding is useful not only in obtaining molded products having high precision shape but in obtaining molded products having good optical characteristics as above described in a short takt time.

For example, in order to obtain molded products with good refractive index distribution, it is effective to slow down the cooling speed of the mold at a temperature near the glass transition temperature. Further, in order to reduce the birefringence, it is effective to set high mold temperature. Since longer cooling time is necessary if the mold cooling speed is decreased and higher mold temperature is used, the efficiency in the use of the molding machine is reduced.

According to the above-described rotary molding system, since the injection-filled mold is moved and cooled in another place, molded products with good optical characteristics can be obtained in a short takt time without reducing the efficiency in the use of the molding machine. However, there are problems in using the rotary molding system. Specifically, although molded products having high precision shape and high precision optical characteristics can be produced in a short takt time, a number of molds that require long cooling time and short takt will be needed. In recent years, with the demand for high precision molded products, high precision shape molds have been also demanded. Thus, it is necessary to prepare a number of high-precision molds in a short takt time.

SUMMARY OF THE INVENTION

The present invention is directed to a plastics molding system useful for obtaining molded products with optical characteristics of small refractive index distribution and birefringence and having high precision shape without using numerous high-precision molds. An optical element obtained by such a plastics molding system is also disclosed.

According to an aspect of the present invention, a molding method of forming a plastic molded product includes preparing at least one mold having a high precision surface plane, preparing a plurality of molds having a surface precision lower than the high precision surface plane, supplying molten resin to the plurality of molds having lower surface precision, cooling the molds supplied with the molten resin for a predetermined length of time while pressure is being applied, taking out a molded member from a cooled mold, setting the molded member which has been taken out in the mold having the high precision surface plane, and melting a surface of the molded member which has been set and pressing the high precision surface plane against the surface of the molded member to form a plastic molded product.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Figure 1A:
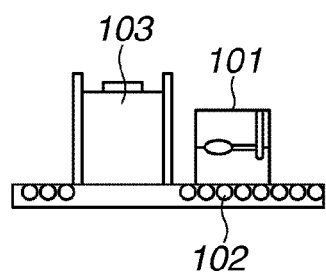
FIGS. 1A to 1H illustrate a plastics molding system according to a first exemplary embodiment of the present invention.

Various exemplary embodiments, features, and aspects of the invention will be described in detail below with reference to the drawings.

A rotary molding system including a heating unit, a molten resin supply unit, a first pressing-cooling unit, and a molded product take-out unit takes a considerable amount of time in applying pressure to the mold and cooling the mold while controlling its temperature and requires a great number of molds in reducing the takt time. Thus, according to the molding method for forming plastic molded products and the plastics molding system of the present invention, a mold having a shape similar to a desired shape but with a lower surface precision level is used in the molding in the above-described process where a considerable number of molds are required. When a molded product is obtained, only the outer surface of the molded products is remolded using a high-precision mold with a desired shape.

To be more precise, the above-described system is configured such that a mold heated by a heating unit and filled with molten resin by the molten resin supply unit is conveyed to a first pressing-cooling unit, a molded product take-out unit, and the heating unit, and circulated in this order by a conveying unit.

First, the first pressing-cooling unit forms a molded product using a mold which has a degree of surface precision similar to but lower than that of the desired shape. On the other hand, in order to remold the molded product taken out from the take-out unit of the molded component, a second pressing-cooling unit different from the first pressing-cooling unit will be used. A mold with a high degree of surface precision, corresponding to the degree of surface precision to be ultimately obtained, will be used in the second pressing-cooling unit. The second pressing-cooling unit re-melts only the surface of the molded product obtained from the first pressing-cooling machine, and then compresses and molds the obtained molded product using the mold with a higher degree of surface precision.

By remolding only the outer surface of the molded product which has been obtained by the rotary molding system using a high-precision mold, the number of high-precision molds can be reduced compared to the conventional rotary molding system. Further, molded products maintaining good optical characteristics can be obtained. Furthermore, cooling time in the remolding process can be reduced.

The molding method of plastic molded products and the plastics molding system of the present invention are especially useful in obtaining molded products having high optical characteristics in the industrial manufacturing line. Such molded products are, for example, aspheric optical lenses that require high optical characteristics regarding birefringence and refractive index distribution as well as high molding precision and surface precision. To be more precise, the molding method and the plastics molding system are useful in forming molded products used for, for example, imaging units including cameras and video cameras, and projection units such as light scanning units including liquid crystal projectors and electrophotography units. Exemplary embodiments of the present invention will now be described with reference to drawings.

The molding method for forming plastic molded products and the plastics molding system according to a first exemplary embodiment of the present invention will now be described with reference to FIG. 1. According to the present embodiment, a plastics molding system used for molding plastic molded products that conveys and circulates the molds in the order the molds are conveyed to the above-described heating unit is configured such that the molten resin supply unit is configured by an injection molding machine. Further, according to the plastics molding system of the present embodiment, after the molding is performed by the rotary molding system using the injection molding machine and a rotary insert core having a degree of surface precision similar to but lower than that of the desired shape, only the outer surface of the molded product is remolded by a high precision mold so that the product has a desired shape.

Since the rotary molding system takes long cooling time, many molds are necessary in reducing the takt time. On the other hand, in remolding the outer surface, since the degradation of the optical characteristics is limited only to the outer surface of a molded optical member, the impact of the remolding will be limited. Further, since the cooling can be quickly performed, the takt time can be reduced. Thus, molds having a lower degree of surface precision can be used in the rotary molding system and a high-precision mold is used in the remolding of the outer surface. In this way, the number of high-precision molds can be reduced and molded products with small refractive index distribution can be obtained.

In other words, according to the present embodiment, at least one high-precision mold having a surface shape used for forming the final surface shape (fine concavo-convex shape or free-form surface) is prepared, and a plurality of molds having a degree of surface precision lower than that of the mold used for forming the final surface shape (fine concavo-convex shape or free-form surface) is prepared for each high precision mold.

According to the present invention, a high-precision mold having a surface shape used for forming a final surface shape (fine concavo-convex shape or free-form surface) will be referred to as a mold having a high precision surface plane. Further, a mold having a lower degree of surface precision than the surface shape used for forming the final surface shape (fine concavo-convex shape or free-form surface) will be referred to as a mold having a lower degree of surface precision. Specifically, the mold having a lower degree of surface precision may have shape error equal to or larger than 20 micrometers and equal to or less than 150 micrometers, preferably equal to or larger than 20 micrometers and equal to or less than 100 micrometers compared with target surface shape. In addition, the mold having a high precision surface plane has a surface plane with higher degree of precision compared to the mold having a lower degree of surface precision. Specifically, the shape error thereof may be equal to or less than 10 micrometers, preferably equal to or less than 1 micrometer compared with target surface shape.

Both the mold having a high precision surface plane and the mold having a lower degree of surface precision may have the surface roughness Ra equal to or less than 100 micrometers, preferably equal to or less than 10 micrometer.

Figure 1B:
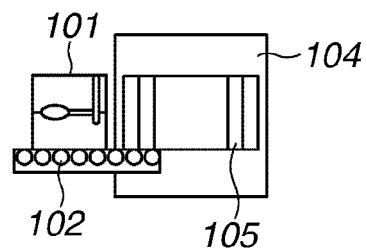
Figure 1C:
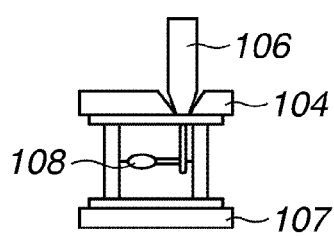
Figure 1D:
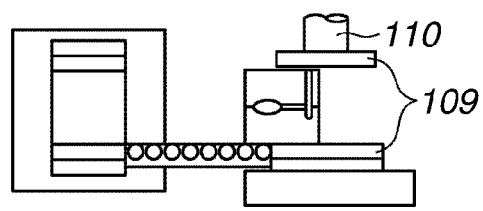
Figure 1E:
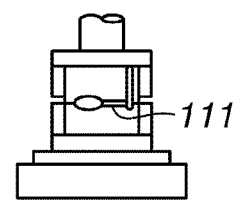
Figure 1F:
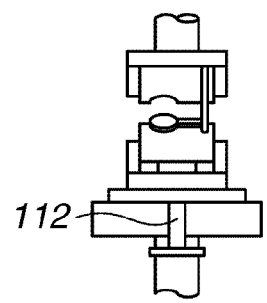
Figure 1G:
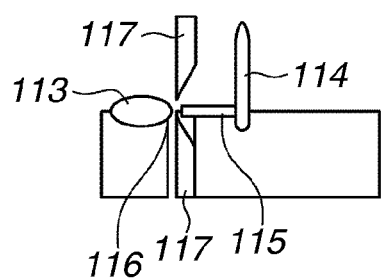
Figure 1H:
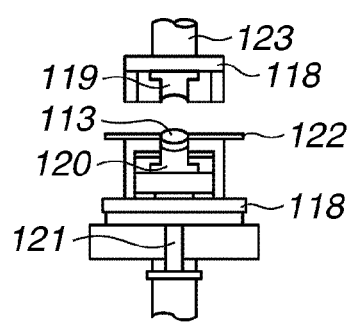

FIGS. 1A to 1F illustrate the plastics molding system according to the present embodiment. FIG. 1A illustrates a mold heating process. FIG. 1B illustrates a mold movement process from the mold heating process to a resin injection process. FIG. 1C illustrates a resin filling process. FIG. 1D illustrates a movement process of the resin-filled mold to a pressing-cooling process. FIG. 1E illustrates the pressing-cooling process of the mold performed by a press machine. FIG. 1F illustrates a take-out process of a molded product from the cooled mold. FIG. 1G illustrates a gate cut process by which the sprue and the runner portions of the molded product which has been taken out from the mold are cut. A sprue is a passage through which the molten material is introduced into a mold. During cooling, the material in the sprue solidifies. Thus, it needs to be removed from the molded product. FIG. 1H illustrates a secondary press process. Only the surface of the molded product having its gate cut is heated and compressed by the secondary press process.

The mold illustrated in the mold heating process in FIG. 1A is used for injection molding. The mold heating process is a process for heating a rotary insert core 101, which is a mold having a surface precision than lower that the desired surface precision of the molded product. The rotary insert core 101 is automatically conveyed to a heating unit 103 by a conveyance roller 102. The rotary insert core 101 is heated to a temperature appropriate for the molding according to a shape of the molded product to obtain, a type of the resin, or optical characteristics of the molded product to be obtained according to the processing.

It is not necessary to process the rotary insert core 101 into the final desired shape. In other words, the shape obtained by the rotary insert core is acceptable so long as a desirable face can be formed by the secondary press process in FIG. 1H described below. Thus, even if the required final surface shape is a free-form surface or a surface having a predetermined form and precision, the obtained molded product is acceptable even if it has a surface shape out of the range of the desired final surface so long as it is within the range of surface precision where the desired surface can be formed by the secondary press process in FIG. 1H. Accordingly, before undergoing the secondary process, the obtained product does not necessarily have a high precision surface.

Figure 2:
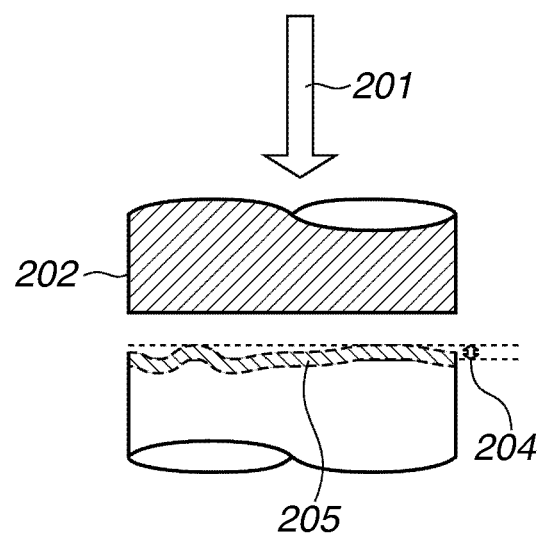
FIG. 2 illustrates the amount of melt of a secondary press process of the plastics molding system according to the first exemplary embodiment of the present invention.

Next, the range of surface precision of a molded product which can be formed into a desirable face by the secondary press process in FIG. 1H will be described with reference to FIG. 2. A desirable face can be formed by the secondary press process if a maximum face-to-face distance 204 between a desired face 202 and a surface of a molded product formed by a mold having a surface shape similar to that of the desired face 202 is a melting amount of melt 205 or lower with respect to the press direction 201. If the maximum face-to-face distance (or re-melt thickness) is such a distance, a high precision face can be obtained by the secondary press process in FIG. 1H.

Further, the re-melt processing in the secondary press process in FIG. 1H deteriorates the refractive index distribution and the birefringence obtained by the pressing-cooling process in FIG. 1E depending on the amount of melt. Thus, the amount of melt in the secondary press process in FIG. 1H and the precision of the surface shape of the rotary insert core used in the processes in FIGS. 1A to 1F can be set according to the desirable optical characteristics.

The mold move process in FIG. 1B is a process by which the rotary insert core 101 is moved from the heating process in FIG. 1A to the injection filling process in FIG. 1C. The rotary insert core 101, which has undergone the heating process, is inserted into a molding machine attachment die set 105 mounted on a stationary platen 104 of the injection molding machine and set at a position where the injection filling of the resin can be performed.

In the injection filling process in FIG. 1C, the resin is filled into the rotary insert core 101 by the injection molding machine. The rotary insert core 101 set in the molding machine attachment die set 105 in the mold move process in FIG. 1B has its cavity portion 108 filled with resin injected by an injection cylinder 106. When the resin is injected, for example, a clamp force of several tens of tons is applied to the rotary insert core 101 by a movable platen 107. Further, at that time, the temperature of the rotary insert core 101 is adjusted to a temperature necessary in the filling of the resin by the molding machine attachment die set 105. Accordingly, the temperature balance of the rotary insert core 101 in the injection filling process is maintained.

The move process in FIG. 1D is a process by which the rotary insert core 101 is moved from the location of the injection filling process in FIG. 1C to the location of the re-pressing-cooling process in FIG. 1E. The rotary insert core 101, having the resin injected and filled in the process in FIG. 1C, is taken out from the molding machine attachment die set 105 with the resin, which is the molded product, in the cavity portion 108. Then, in a pressure-released state, the rotary insert core 101 is conveyed on the conveyance roller 102 and set in a pressing-cooling die set 109 mounted on a pressing-cooling machine.

The pressing-cooling process in FIG. 1E is a process for pressing and cooling the rotary insert core 101 by the pressing-cooling machine. In this process, a compression pressure is applied to the rotary insert core 101 set in the pressing-cooling die set 109 in the process in FIG. 1D by a press cylinder 110. When the pressure is applied, the rotary insert core 101 is simultaneously cooled while its temperature is controlled by the pressing-cooling die set 109. When the resin in the rotary insert core 101 is solidified by the cooling, a molded product 111 is formed in the rotary insert core 101. The compression pressure applied to the pressing-cooling die set 109 and the temperature of the pressing-cooling die set 109 are controlled based on the pressure and the temperature gradient measured by a pressure sensor and a temperature sensor provided in the rotary insert core 101. Thus the state of solidifying by the cooling is controlled.

In this way, by controlling the temperature gradient and the pressure at the time of cooling, generation of birefringence due to the stress that occurs when the rotary insert core 101 is filled to form the molded product 111 and refractive index distribution due to the shrinkage and the internal stress strain that occur at the time of cooling can be prevented. Further, a molded product having a shape similar to a desired shape with good optical characteristics can be obtained. When the rotary insert core 101 is cooled at a speed of 10° C./min or less, the refractive index distribution and the birefringence can be reduced depending on the shape and the material of the lens.

The molded product take-out process in FIG. 1F is a process for taking out the molded product. The rotary insert core 101 including the molded product 111 and cooled by the process in FIG. 1E is opened at the parting portion by a press machine. Then, the molded product 111 is mold-released from the rotary insert core 101 by a molded product ejection cylinder 112 provided in the press machine. The rotary insert core 101, which has the molded product 111 taken out in the process in FIG. 1F, has its parting portion closed again. Then the rotary insert core 101 is returned to the above-described processes in FIGS. 1A to 1F.

In the description of the above-described exemplary embodiment, in order to simplify the description, motion of one rotary insert core is explained. Actually, however, a plurality of insert cores is simultaneously processed in order by the above-described processes in FIG. 1A to FIG. 1F. Further, although the heating process of the rotary insert core 101 in FIG. 1A can be performed by the injection molding machine, as is with the present exemplary embodiment, it is desirable to provide the rotary insert core 101 in a machine different from the injection molding machine from the viewpoint of reducing the molding time.

In the gate cut process in FIG. 1G, the gate of the molded product taken out by the processing in FIG. 1F is cut. In addition to a necessary molded member 113, which becomes a lens, the molded product 111 molded by injection molding includes a sprue 114, a runner 115, and a gate 116. By cutting the molded product 111 at the gate 116, the necessary molded member can be taken out. A gate cutting apparatus is provided for the gate cut process. The gate cutting apparatus includes a cutter 117. The temperature of the cutter 117 can be changed according to the resin that is used. The cutter 117 includes two blades, one arranged above the other. The gate 116 is cut after it is set at a position between the blades.

The secondary press process in FIG. 1H is a secondary press process. An upper insert core 119 and a lower insert core 120, each of which is a part of a mold having a desired shape and surface precision, are set on secondary press die sets 118. The lower insert core 120 moves up/down by a press cylinder 121. At the time the molded member 113 is set, the lower insert core 120 is retracted. After the molded member 113, which has been taken out in the gate cut process in FIG. 1G, is set on the secondary press die set 118, a positioning mechanism 122 slides into the mold. The position of the molded member 113 is determined by the positioning mechanism 122.

After the position of the molded member 113 is determined, the positioning mechanism 122 is retracted. Then the molded member 113 is clamped by a clamp cylinder 123. In forming a desired face shape, the surface of the molded member 113 is heated and receives compression pressure.

Only the surface is melted by heating the surface. Specifically, the melted surface is preferably equal to or less than approximately 100 micrometers.

By heating the surface of the molded member 113 and melting only the surface of the molded member 113, the birefringence and refractive index distribution obtained in the pressing-cooling process in FIG. 1E changes only in the molten outer surface of the molded member 113. As a whole, a molded product having a desired shape with small birefringence and refractive index distribution can be obtained. Thus, faster cooling speed can be set regardless of the change in refractive index distribution or birefringence in the secondary press process in FIG. 1H. Further, since only the molten outer surface is required to be cooled, the heat capacity for cooling can be reduced. Accordingly, the cooling time can be reduced. Although the cooling speed depends on the shape and the material of the lens, cooling at this time can be performed at 40° C./min or more.

As described above, the cooling time of the secondary press process in FIG. 1H can be set shorter than the cooling time of the pressing-cooling process in FIG. 1E. Thus, when compared with the conventional rotary molding that requires a plurality of high precision molds in the pressing-cooling process, molded products of a desired face shape and with small refractive index distribution can be obtained more expeditiously and with a small number of molds.

Next, the plastics molding system according to a second exemplary embodiment of the present invention will be described with reference to FIGS. 4A to 4F. According to the present exemplary embodiment, regarding a plastics molding system that circulates molds in the order they are conveyed to the above-described heating unit so that plastic molded products are obtained, the molten resin supply unit includes a discharge unit that discharges plasticized resin into a lower mold.

Regarding the plastics molding system according to the present exemplary embodiment, after obtaining a molded product using a rotary molding system that employs press molding and a rotary insert core, which is a mold having a shape similar to the desired shape but with a lower degree of surface precision (lower degree of surface precision than high precision surface plane), only the outer surface is molded again so that it has a desired shape by using a high-precision mold. According to the present exemplary embodiment, in addition to the effect obtained by the first exemplary embodiment, the pressing can be started at a higher temperature in the cooling pressing process. Thus, a molded product having smaller birefringence compared to the product obtained according to the first exemplary embodiment can be obtained.

Figure 4A:
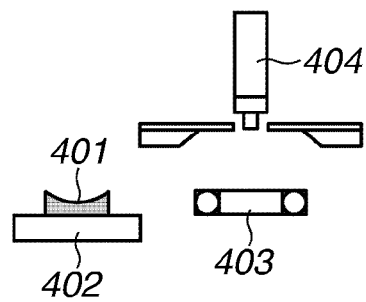
FIGS. 4A to 4F are schematic diagrams of the plastics molding system according to a second exemplary embodiment of the present invention.
Figure 4B:
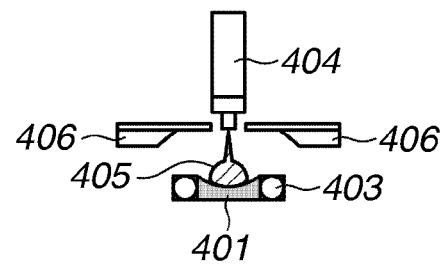
Figure 4C:
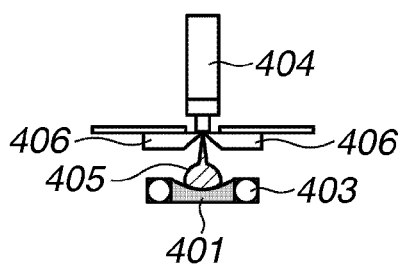
Figure 4D:
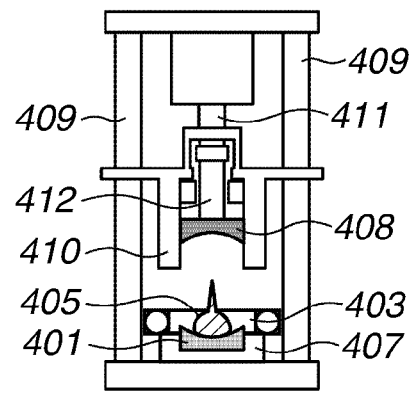
Figure 4E:
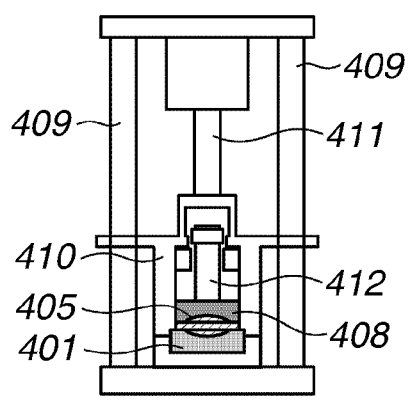
Figure 4F:
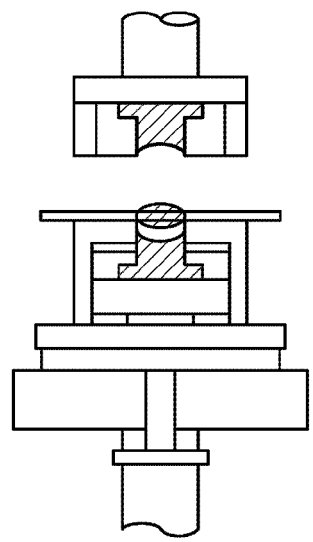

FIGS. 4A to 4F illustrate the plastics molding system according to the present exemplary embodiment. FIG. 4A illustrates a mold heating process. FIG. 4B illustrates a discharge process of a resin to a lower mold. FIG. 4C illustrates a cutting process of the discharged resin. FIG. 4D illustrates a loading process of the resin-filled lower mold onto a press machine. FIG. 4E illustrates a pressing-cooling process performed by a press molding machine. FIG. 4F illustrates a secondary press process used for heating only the surface of the product molded by the pressing-cooling process in FIG. 4E and applying pressure so that the product is remolded.

The mold heating process in FIG. 4A is a process for heating a rotary lower insert core (lower mold) 401. The rotary lower insert core 401 is conveyed by a conveying robot, set on a heating station 402, and heated.

As is with the first exemplary embodiment, the rotary lower insert core 401 is not necessarily worked into a desired shape, and is acceptable so long as a desired face can be formed in the subsequent secondary press process in FIG. 4F. Thus, even if the final surface shape is a free-form surface or a high precision surface plane, the surface shape does not necessarily have such a face so long as the desired face can be formed in the secondary press process in FIG. 4F. Thus, the surface is not necessarily a high precision surface plane. Therefore, a plurality of high precision molds is not necessary. Accordingly, the fabrication cost of the molds can be reduced. Further, the heating of the rotary lower insert core 401 is effective in obtaining good contact of the resin to the mold when the resin is elongated in the subsequent discharge process in FIG. 4B.

The mold temperature at that time is a temperature that enables good contact of the resin to the mold and is desirably 10° C. or higher than the glass transition temperature (Tg) of the resin which is used.

The discharge process in FIG. 4B is a process for discharging the resin onto the rotary lower insert core 401, which is heated by the heating process in FIG. 4A, by a discharge apparatus 404. A robot having a hand 403 with a heater conveys the rotary lower insert core 401 from the heating station 402 to a position below the discharge apparatus 404. The heater of the hand 403 maintains the temperature of the rotary lower insert core 401, which is heated, while it is conveyed. After the conveyance of the rotary lower insert core 401 to the discharge position, a resin 405, which has been plasticized and molten by the discharge apparatus 404, is discharged on the rotary lower insert core 401.

The resin cutting process in FIG. 4C is a process for cutting the discharged resin 405 and separating it from the discharge apparatus 404. When blades 406 provided below the discharge apparatus 404 is closed, the resin is cut off of the discharge apparatus 404.

The loading process in FIG. 4D is a process for loading the rotary lower insert core 401 with the discharged resin 405 on a pressing-cooling machine. The rotary lower insert core 401 is loaded onto a lower mold 407 of the pressing-cooling machine. The position of the rotary lower insert core 401 is determined as it fits with the lower mold 407. An engagement portion where the rotary lower insert core 401 fits in is formed on the lower mold 407. When the hand 403 reaches the lower mold 407 while holding the rotary lower insert core 401, the hand 403 opens and releases the rotary lower insert core 401. Then, the rotary lower insert core 401 fits in the engagement portion and is set in position. After that, the hand 403 retracts.

The pressing-cooling process in FIG. 4E is a pressing-cooling process for molding the resin 405 by the rotary lower insert core 401 with the resin 405 loaded in the loading process in FIG. 4D and a previously mounted upper die 408. The rotary lower insert core 401 (the lower mold) is configured to be used in combination with the upper die 408 (upper mold) of a pressing-cooling unit (first pressing-cooling unit) used in the pressing-cooling process. The rotary lower insert core 401 with the resin 405 and an upper body mold 410 provided on guides 409 are clamped by a cylinder 411.

The upper die 408 is mounted in advance on a press shaft 412 of the upper body mold 410. The resin is molded by the compression pressure applied to the upper die 408 by a press cylinder 412. A heater and a cooling mechanism are provided on the upper body mold and the lower mold, so that the molds can be heated or cooled and set to a desired temperature.

Thus, the temperature of the resin 405 is controlled and cooled by the upper body mold 410 and the lower mold 407 while pressure is applied to the injected resin 405. The cooling processing causes the resin in the cavity to be cooled and solidified so that a molded product is formed. The state of solidification by cooling is controlled by controlling the compression pressure and the temperature of the upper insertion core 408. In other words, the state is controlled based on the pressure obtained by a cylinder and the temperature gradient obtained by a temperature sensor provided in the rotary insertion core. The cylinder and the temperature sensor are calibrated in advance.

In this manner, the birefringence which is caused by the stress that occurs when the resin is filled and the refractive index distribution that occurs by shrinkage and internal stress strain that occurs when cooling is performed can be prevented by controlling the temperature gradient and the pressure when the resin is cooled. Then a molded product having a shape similar to the desired shape and with good optical characteristics can be obtained. The refractive index distribution can be reduced by employing a cooling speed of 10° C./min or lower depending on the shape or the material of the lens.

Further, it is effective to perform molding at high press temperature in reducing the birefringence. It is known that birefringence occurs due to orientation of molecules generated by the stress that occurs at the time of filling or pressing. Thus, by raising pressing temperature, the viscoelasticity of the resin can be decreased and the stress that occurs at the time of pressing can be reduced. Further, if the viscoelasticity of the resin is small, the oriented molecules can be relaxed rather easily. Thus, it is desirable that the start temperature in the pressing is high. Further, if molding is performed at a temperature equal to or higher than 50° C. from the glass transition temperature (Tg), the birefringence due to molding can be substantially eliminated.

In using the injection molding rotary insert core according to the first exemplary embodiment, a resin filling port is necessary and it opens. Thus, in most cases, when pressing is performed using various types of resin at a temperature equal to or higher than the glass transition temperature (Tg) of the resin, the resin leaks from the filling port and adheres to the rotary insert core. This will lead to defects. Further, pressure may not be applied as desired due to the leakage.

According to the present exemplary embodiment, since the resin is hermetically sealed by the press molding using the upper and lower rotary insert cores and the body, the leakage of the resin can be prevented and the pressing start temperature can be set to a higher temperature. On the other hand, since high pressing temperature requires long cooling time, the pressing start temperature is determined as appropriate according to the desired optical characteristics.

The secondary press process in FIG. 4F is similar to the secondary press process in the first exemplary embodiment. According to the present exemplary embodiment, since the compression molding using the body mold is set in the pressing-cooling process in FIG. 4E, a higher press temperature can be used compared to the first exemplary embodiment. Accordingly, a molded product of small birefringence can be obtained. Further, members such as a runner and a sprue are not used and the gate cutting process will be unnecessary. Furthermore, since only the lower insert core is moved, a simple and small conveyance apparatus can be used compared to a case where the injection molding mold has to be moved.

A cutting trace removing process according to a third exemplary embodiment of the present invention will now be described with reference to FIGS. 7A to 7D. Since the manufacturing method of the present embodiment is similar to the manufacturing method of the second exemplary embodiment, the overlapping points are not repeated in the description below and only the points which are different from the plastics molding system of the second exemplary embodiment will be described.

According to the third exemplary embodiment, a glass molded product (glass mold) is used for the rotary insert cores, which is the upper mold and the lower mold and the cutting trace removing processing is provided after the processing corresponding to the cutting processing in FIG. 4C of the second exemplary embodiment. According to the present embodiment, since press molding is used as is with the second exemplary embodiment, a simple mold configuration is realized. Thus, rotary insert cores formed by glass molding can be used for the upper and the lower rotary insert cores.

A rotary insert core manufactured by glass molding is desirable for use in the rotary molding system of the present invention, which requires many rotary insert cores, as it can be easily manufactured compared to a metal insert core. Generally, glass transition temperature of commercial glass for molding is 350° C. or higher. Since the heat applied to the rotary insert core is 270° C. in the present exemplary embodiment, the temperature of the rotary insert core will not exceed the glass transition temperature. The rotary insert core manufactured by glass molding according to the present exemplary embodiment can be handled in a manner same as the rotary insert core in the second exemplary embodiment.

Figure 7A:
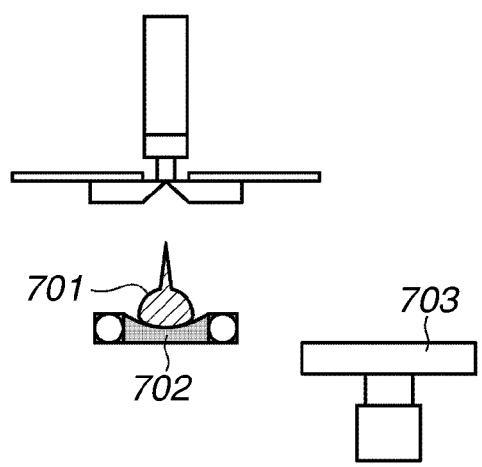
FIG. 7A to 7D are schematic diagrams of a cutting trace removing process according to a third exemplary embodiment of the present invention.
Figure 7B:
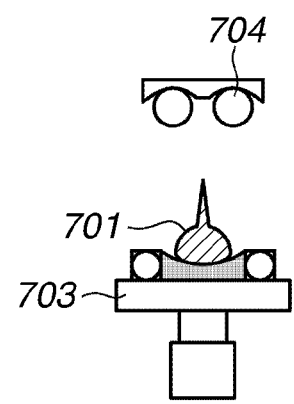
Figure 7C:
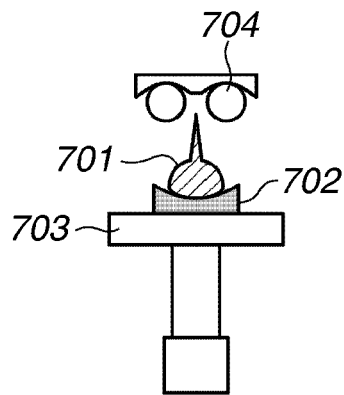
Figure 7D:
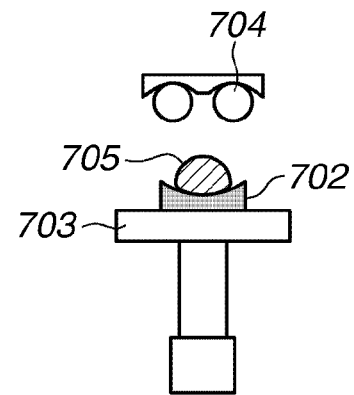

As illustrated in FIGS. 7A to 7D, as is with the second exemplary embodiment, a rotary lower insert core 702, on which the resin 701 having the cutting trace and conveyed from the cutting process is mounted (see FIG. 7A), is set on a vertical motion stage 703 (see FIG. 7B). A heater provided on the vertical motion stage 703 prevents temperature of the bottom of the insert core from falling. Further, an infrared lamp 704 serving as an emission unit of infrared rays is set on the vertical motion stage 703. When the rotary lower insert core 702 is set on the vertical motion stage 703, the vertical motion stage elevates (see FIG. 7C). Then, the resin 701 having the cutting trace is heated by the infrared lamp 704. The cutting trace of the heated resin shrinks as it melts. As a result, a molten resin 705 with oval shape is obtained (FIG. 7D).

If a cut trace formed in the cutting process is folded when the resin is pressed and if the melting of the resin is not sufficient in the pressing-cooling process, a weld line may be formed. If the mold temperature is high enough and if long heating time is allowed, the cutting trace melts and does not affect the quality of the molded product. However, in the case where takt time is reduced by increasing cooling speed, it is effective to melt the resin in advance in obtaining molded products without a weld line. Further, since such a weld line affects optical characteristics such as birefringence even if the shape of weld line is not observed, it is desirable to include the cutting trace removing process as is with the present exemplary embodiment, A configuration example of the secondary press apparatus according to a fourth exemplary embodiment of the present invention will be described. Since the manufacturing method of the present exemplary embodiment is similar to the manufacturing method of the third exemplary embodiment, the overlapping points are not repeated in the description below and only the points different from the manufacturing method of the third exemplary embodiment will be described.

Figure 8:
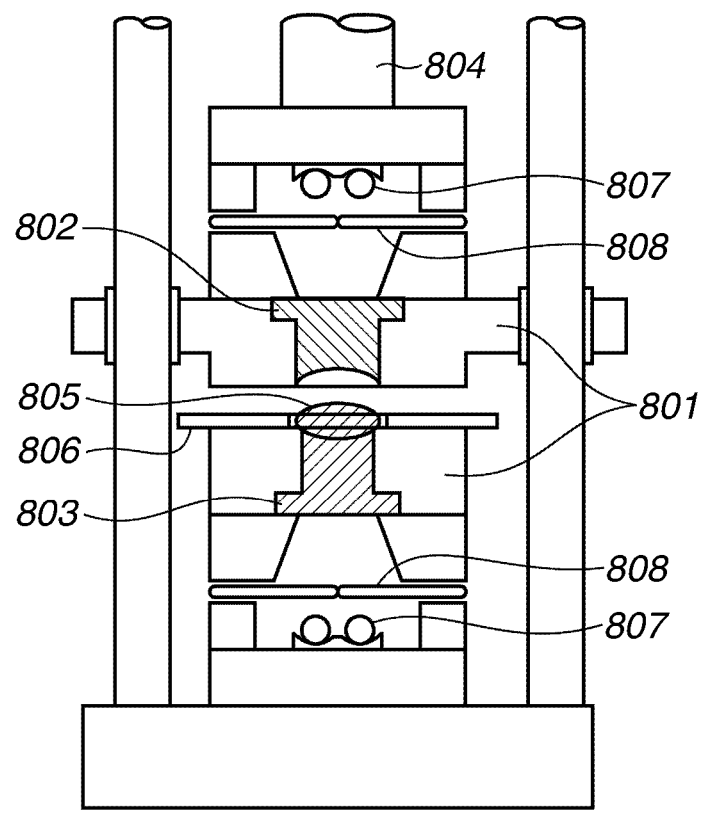
FIG. 8 is a schematic diagram illustrating an example of a secondary press apparatus according to a fourth exemplary embodiment of the present invention.

The present embodiment is similar to the third exemplary embodiment except that a secondary press apparatus using lamp heating is used in the secondary press process. As illustrated in FIG. 8, in a secondary press apparatus according to the present exemplary embodiment, an upper insert core 802 and a lower insert core 803, both of which are made of quartz, are provided as a mold having a high precision surface plane of a desired shape in a secondary press die set 801. The upper insert core 802 is moved up/down by a press cylinder 804 and compression pressure is applied to a molding member 805.

The molding member 805, which is taken out from the pressing-cooling process which is the previous process, is set on a lower insert core set in the secondary press die set 801 by a handling robot. After that, a positioning mechanism 806 slides into the mold. The position of the molding member 805 is determined by the positioning mechanism 806. After the position of the molding member 805 is determined, the positioning mechanism 806 retracts. Then, pressure is applied to the molding member 805 by the press cylinder 804 and the high precision surface plane of the mold having a high precision surface plane is pressed against the molding member.

As the heat source, a mid-infrared lamp 807 arranged on the opposite side of the pressing side of the upper insert core is used. Another mid-infrared lamp 807 is also arranged on the opposite side of the pressing side of the lower insert core. Since lighting-up of the lamp takes some time, it is desirable to switch the light on and off by, for example, a shutter 808.

If the shutter 808 is opened, the molding member 805 is heated by the emission of the infrared rays. Since the wavelength of mid-infrared rays are well absorbed by the resin of the molding member, the infrared rays are well absorbed near the surface of the molding member. Since the infrared rays are reduced in the depth direction, they are useful in melting only the surface of the molding member. Further, since heating by a lamp is not heat conduction caused by contact, the temperature of the molding member rises quickly. Moreover, difference in the amount of melt depending on the shape of the molding member is small.

When the pressing is started, the shutter 808 is opened and the molding member 805 is formed into a desired face shape. Since the molding member is heated by the lamp, the temperature rises quickly and the surface of the molding member reaches the desired temperature in a few to several tens of seconds. Further, since the resin near the surface absorbs infrared rays, the temperature of the resin near the surface rises and the viscosity is reduced. However, since the mold transmits infrared rays, the temperature rise of the mold is little. The cooling does not take time, so that the takt time can be reduced. The cooling in this process can be performed at 100° C./min or greater depending on the shape and the material of the lens.

According to the present exemplary embodiment, since an infrared lamp used only for melting the surface of the molding member is used, a material that can transmit mid-infrared rays is required for the mold in this process. For example, infrared transmissive glass, which transmits mid-infrared, such as zinc selenide, sapphire, and quartz can be used. Among these materials, quartz is most desirable as it can be processed easily. Wavelength of the ray that is transmitted by quartz differs depending on a composition of quartz. Thus, the composition of the quartz is determined according to the absorbance of the material to be molded. Out of the various types of quartz, anhydrous quartz is a desirable material as it has a wide range of transparent wavelength.

The wavelength in the range of 2600 nm or higher is greatly absorbed by resin. If the quartz includes a hydroxyl group in its composition the quartz absorbs wavelength in the region of 2600 nm or higher, which is the wavelength that is absorbed by the resin, so that heating efficiency will be reduced. Since the anhydrous quartz includes less hydroxyl group, sufficient transmissivity can be obtained in the wavelength region of 2600 nm or higher As a first exemplary example, a configuration of a molding system that sequentially performs each of the processes illustrated in FIGS. 1A to 1H of the above-described first exemplary embodiment will be described with reference to FIG. 3. In the present exemplary example, a rotary molding system whose takt time of the injection filling process is set to 60 seconds will be described.

Figure 3:
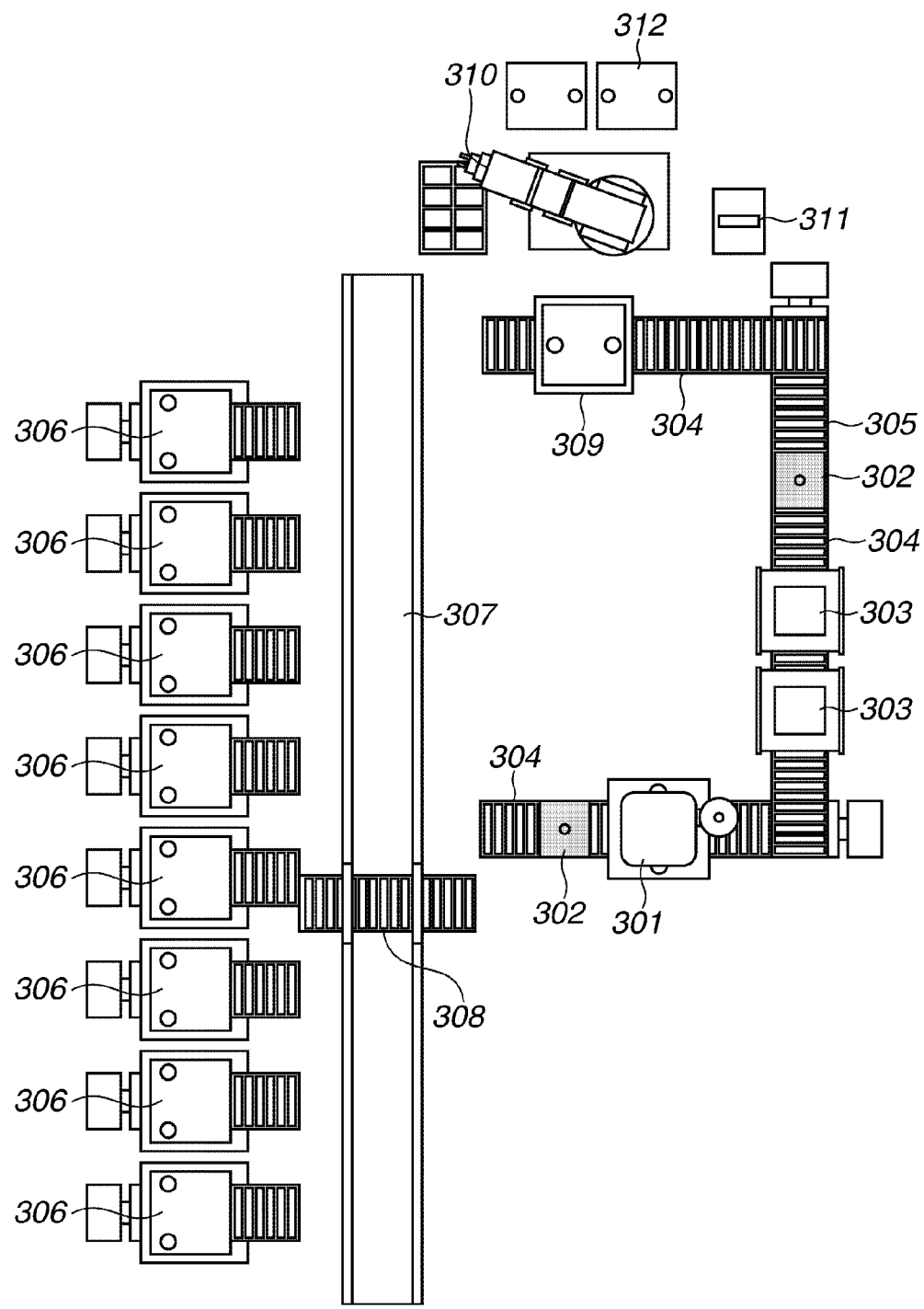
FIG. 3 is a schematic diagram of the plastics molding system according to a first exemplary example of the present invention.

FIG. 3 is a schematic diagram of the rotary molding system of the first exemplary example of the present invention. In the present exemplary example, a double convex lens with an outer diameter of 9 mm and a central thickness of 3 mm was manufactured. As the molding material, a polyolefin resin (ZeonexE48R: product of Zeon Corporation) was used. The polyolefin resin was input in a hopper of an injection molding machine 301. Then the resin was plasticized and melted by the injection molding machine.

The plasticization temperature was set to 270° C. A rotary insert core 302 including a sprue, a runner, and a gate for the injection filling was used. One cavity, having a shape of a double convex lens to be formed by this example, was formed at the end of the gate. Although only one cavity is provided in this exemplary example, there is no limit regarding number of cavity. The rotary insert core 302 used in this example does not need surface precision. Thus the rotary insert core was formed only by the cutting processing and does not have a high precision surface plane.

The parting line of the rotary insert core 302 was arranged parallel to a side face of the lens that is molded. The sprue was arranged at a right angle with respect to the parting line. In the present exemplary example, the pressing direction in the cooling process was vertical with respect to the parting line. Thus, although the injection molding machine is normally horizontal, in order to eliminate the process necessary in changing the orientation of the rotary insert core in the press process, a vertical type injection molding machine was used in the filling of the resin into the rotary insert core 302.

First, the rotary insert core 302 was set in a heating unit 303 of the heating process. Then, the rotary insert core 302 set in the heating unit 303 was heated to 120° C. Since the rotary insert core 302 used in the present example takes two minutes to be heated to 120° C., two heating units 303 corresponding to the takt of the injection filling process were prepared.

The rotary molding system in this example was configured such that while heating of one rotary insert core 302 is performed by one heating unit, a different rotary insert core 302 can be similarly heated by the other heating unit with shifting operation time by the time corresponding to one takt. Further, the rotary molding system was configured such that each process such as the heating process and the injection filling process is connected by a rotary insert core conveyance path 304 and an integrated drive source rotates a roller 305 arranged in the conveying direction of the rotary insert core. The rotary insert core 302 was conveyed to each process.

The rotary insert core 302, which was heated to 120° C., was conveyed via the rotary insert core conveyance path 304 and inserted into a die set in the injection molding machine and clamped. Then, a resin heated to 270° C. was injected into the clamped rotary insert core 302. After then, the pressure of the rotary insert core 302 was maintained for a predetermined amount of time. When the given amount of time has elapsed, the mold of the die set was opened and the rotary insert core 302 was carried out. The takt time was set to 60 seconds.

The rotary insert core 302, which was taken out, was conveyed to the pressing-cooling process via the rotary insert core conveyance path 304. Eight pressing-cooling units 306 were used in the pressing-cooling process. The pressing-cooling units 306 were arranged side-by-side with a predetermined distance in between. The rotary insert core 302 was supplied to an empty pressing-cooling unit by a rotary insert core supply unit 308 which moves on a guide rail 307.

When the rotary insert core 302 was supplied to an empty pressing-cooling unit, temperature adjustment members provided above and below moved to the rotary insert core 302 and applied pressure to the rotary insert core 302. After that, the rotary insert core 302 was cooled by a coolant that flows inside the pressing-cooling die set. In this manner, the molded product was efficiently cooled while decreasing the internal stress-strain that occurs inside to the minimum.

In the present exemplary example, the cavity was cooled from approximately 120° C. to 80° C. by the cooling process. After the rotary insert core 302 was cooled for a predetermined period of time, the pressing-cooling die set was opened and the rotary insert core 302 was taken out. In the present example, the time from the supply of the rotary insert core 302 until it was taken out was set to 480 seconds. If a high precision mold having a desired shape is to be mounted on the rotary molding machine of the present example, eight sets of such high precision molds will be necessary.

The rotary insert core supply discharge unit 308 conveyed the rotary insert core 302 to a molded product take-out (extraction) unit 309. At the molded product take-out unit 309, the mold was opened and the molded product was taken out from the rotary insert core 302 by a handling robot 310. The rotary insert core 302 after the molded product was taken out was clamped and then conveyed to the heating unit 303 of the heating process.

The molded product taken out by the handling robot 310 was conveyed to the gate cut process. A gate cutting unit 311 is provided in the gate cut process. The temperature of a cutting portion of the gate cutting unit 311 can be set depending on the resin that is used. In the present example, the temperature was set to 200° C. The cutter portion includes two blades, arranging one above and the other below. When the gate portion was fixed at a position between the blades, the gate portion was cut by the blades.

The surface shape of the molded product having a shape similar to the desired shape obtained by the processes described above was measured. The maximum face-to-face distance from the desired face shape was 0.1 mm. The molded member (molded product) whose gate was cut was conveyed to the secondary press process by the handling robot 310. In a secondary press apparatus 312 of the secondary press process, each of insert cores having a high precision surface plane and heated to 210° C. was set in each of the upper and lower molds. After that, the molded member was set on the lower mold by the handling robot 310. Before the molded member was set on the lower mold, the insert core of the lower mold was retracted so that the molded member is not heated until the application of pressure is started.

After the position of the molded member set on the lower mold was determined by a positioning unit of the secondary press apparatus, the mold was closed. The insert core set on the lower mold moved upward to the molded member so that it contacts the molded member at the same time the mold was closed. Then, the application of pressure was started. At that time, the imposed load was measured by a pressure sensor in the insert core set on the lower mold. The insert core set on the lower mold was moved 0.4 mm up from the position where the load had been imposed and then stopped. At that time, a load of 20 kgf was imposed on the insert core. Then, a portion of the molded member that contacted the insert core which has been heated to 210° C. collapsed as the surface temperature of that portion reached the softening temperature. When the molded member collapsed, it spread out and the contact face expanded until the whole molded member contacted the mold having a high precision surface plane.

In this exemplary example, since the maximum face-to-face distance between the molded product and the desired shape was 0.1 mm, in order to melt the upper and lower lens surfaces of a maximum thickness of 0.2 mm and apply pressure to the surfaces, the insert core of the lower mold was moved 0.4 mm up from the clamp state. Then, the insert core was maintained in that state for 10 seconds. After that, the insert cores were cooled to 120° C. at a speed of 50° C./min. When the upper and the lower insert cores were cooled to 120° C., the insert core of the lower mold was retracted and the mold was opened. After that, the lens molded product was mold-released from the mold, and the optical element of the first exemplary example was obtained.

In this exemplary example, the time from the loading to the taking out of the lens was set to 120 seconds. Thus, in this example, two secondary press apparatuses 312 were used in the secondary press process.

Although eight sets of high precision molds are necessary when only the rotary molding is used, according to this exemplary example, the necessary number of high precision molds is reduced to two sets, which are used in the two secondary press apparatuses in the secondary press process. Accordingly, the number of high precision molds can be reduced. Further, the optical element obtained according to the present exemplary example was formed into a desired shape.

The refractive index distribution was measured and an optical element having the distribution of 1.2×10-4 was obtained. The refractive index distribution is a difference of the maximum value and the minimum value of the refractive index in the thickness direction of the central portion of a lens. In order to obtain a lens which can be used as a comparison example, such a lens was manufactured using a general injection molding and with a takt time set to 150 seconds. As the comparison example, a double convex lens having the outer diameter of 9 mm and the central thickness of 3 mm was manufactured.

In obtaining the molded product of the comparison example, an amorphous polyolefin resin (ZeonexE48R: product of Zeon Corporation) was used as the molding material. Further, the molding was performed at a plasticization temperature of 270° C., a molding temperature of 130° C., and cooling time of 120 seconds. The refractive index distribution of the molded product of the comparison example was 2.9× 10-4 and the maximum value of birefringence was 150 nm at an area within 8 mm from the center of the lens.

The optical element refractive index distribution of the first example of the present invention was, as described above, 1.2×10-4. Thus, according to the first exemplary example, an optical element with small refractive index distribution was obtained compared to the comparison example manufactured by injection molding using polyolefin resin.

As a second example, a configuration example of a molding system that can sequentially perform each of the processes illustrated in FIGS. 1A to 1F of the above-described second exemplary embodiment will be described with reference to FIG. 5. In the present example, a rotary molding system using press molding and whose takt time is set to 60 seconds will be described.

Figure 5:
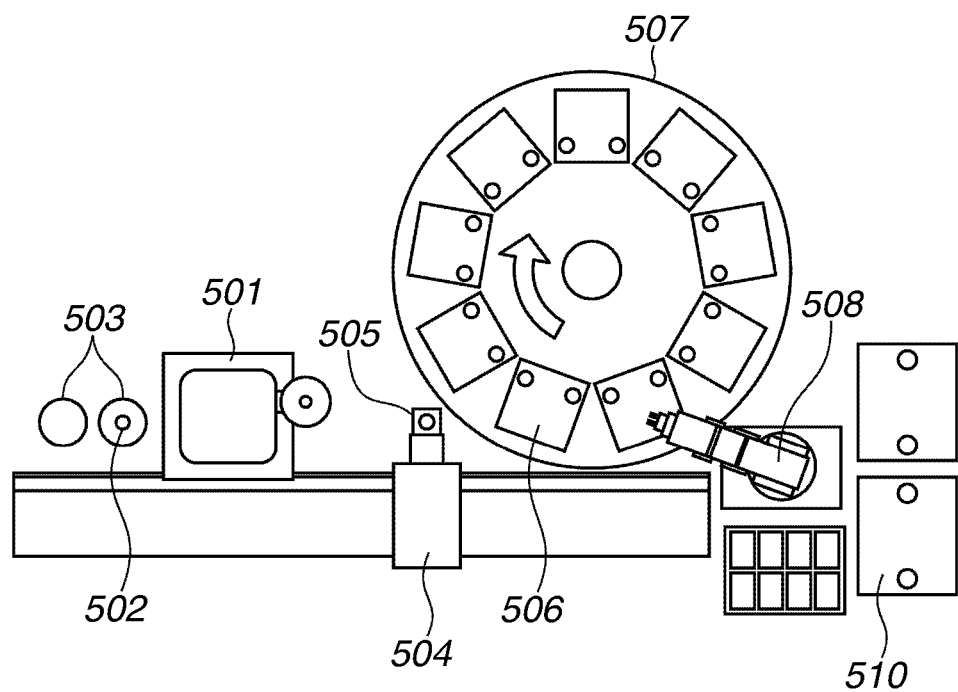
FIG. 5 is a schematic diagram of the plastics molding system according to the second exemplary example of the present invention.

FIG. 5 is a schematic diagram of a rotary molding system of the present exemplary example. The lens manufactured according to this exemplary example is a double convex lens same as the double convex lens manufactured according to the first example. Thus the outer diameter is 9 mm and the central thickness is 3 mm. Amorphous polyolefin resin (ZeonexE48R: product of Zeon Corporation) was used as the molding material. The molds used for the press molding were configured with upper and lower rotary insert cores, a body mold, and a lower mold used for positioning.

The rotary insert core which was conveyed was only the lower insert core. The upper insert core, the body mold, and the lower mold were set in advance in a pressing-cooling machine installed in a pressing-cooling station. As is with the first example, the rotary insert core used in this example does not need surface precision. Thus the rotary insert core was formed only by cutting processing and did not have a high precision surface plane.

The amorphous polyolefin resin was put in a hopper of a discharge unit 501 and plasticized and melted by the discharge unit. The plasticization temperature was 250° C. and the temperature of the end of the nozzle was 250° C. The configuration of the discharge unit 501 was the same as that of the plasticization mechanism of a general purpose in-line screw-type injection molding machine and measurement and discharge were repeated on an intermittent basis.

First, a rotary lower insert core 502 was set on a heating unit 503 in the heating process. The rotary lower insert core 502 set on the heating unit 503 was heated to 170° C. The rotary lower insert core 502 in this example takes two minutes to be heated to 170° C. Thus, two heating units 503 that correspond to the takt of the discharge process were provided.

The rotary molding system in this example is configured such that while heating of one rotary lower insert core 502 is performed by one heating unit, a different rotary lower insert core 502 can be similarly heated by the other heating unit with shifting operation time by the time corresponding to one takt. The rotary lower insert core 502 was conveyed by a two-axis robot 504. The rotary lower insert core 502 was held by an open/close movement of a hand 505 using a rack-and-pinion. Further, the hand 505 was heated to 270° C. by a heater mounted on the hand 505. Furthermore, nitrogen heated to 170° C. was supplied to the hand 505 to form an atmosphere of nitrogen. The atmosphere of nitrogen is useful in preventing resin from being oxidized and degraded. In this manner, the rotary insert core was able to be conveyed in a nitrogen atmosphere.

A cutting unit 506 on which a cutting tool was mounted was set at the end of the nozzle. An air cylinder opens/closes the cutting tool provided on a guide so that the cutting tool cuts the discharged resin and separates the resin from the discharge unit 501. Then, the rotary lower insert core 502 heated by the heating unit 503 was conveyed to the end of the nozzle of the discharge unit 501 by the two-axis robot 504.

The rotary lower insert core 502 moved downward as the resin of 0.1 g was discharged from the discharge unit 501. The shape of the rotary lower insert core 502 was adjusted by the discharged resin. In other words, the outer diameter of the discharged resin was adjusted so that when the rotary lower insert core and the body mold are clamped in the subsequent pressing-cooling process, the resin is not discharged to the meeting faces.

The resin elongated by the downward movement of the rotary insert core was cut by a cutting unit (not shown). As a result, plasticized molten resin on the rotary lower insert core was obtained. Then, the rotary lower insert core with the molten resin was moved to a pressing-cooling unit 506 by the two-axis robot 504. The pressing-cooling unit 506 includes a body mold, a lower mold, and a press shaft, which are connected to one another by an air cylinder and move up/down. Accordingly, the body mold and the lower mold were clamped and pressed.

In this exemplary example, nine sets of the pressing-cooling unit 506 are arranged on a rotary index 507 and the rotary lower insert core, which is sequentially conveyed, goes under the pressing-cooling process. The conveyed rotary lower insert core with the resin was further conveyed to the lower mold. By opening the hand 505, the rotary lower insert core was set on the lower mold. The lower mold included a fitting portion used for the positioning of the rotary lower insert core. An engagement portion was provided in the fitting portion.

After the rotary lower insert core was positioned in the fitting portion, the body mold was moved down by a cylinder and clamping was performed. A heater is provided on the body mold and on the lower mold. In this exemplary example, the molding was performed under temperature conditions of 190° C., 180° C., 170° C., and 150° C.

A press shaft and an upper die were set inside the body mold. After the clamping, the press shaft moved down by a cylinder and the resin between the upper insert core and the rotary lower insert core was molded by a pressure of 20 kgf. In the present exemplary example, since a cut trace of the discharged resin remains, after maintaining the mold at each temperature for 60 seconds, the mold was cooled by air at a cooling speed of 10° C./min. While the mold was cooled, constant pressure was applied to the mold until the mold was released. When the temperature was lowered to 120° C., the body mold was opened and a molded product with a shape similar to the desired shape was taken out by a handling robot 508.

Figure 6:
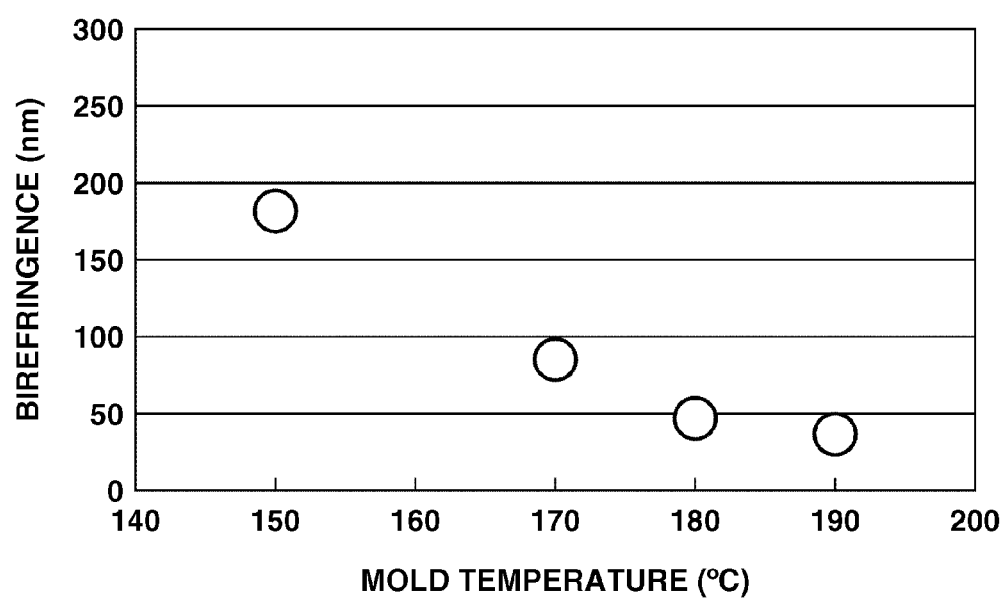
FIG. 6 illustrates a result of birefringence measurement of the molded member according to the second exemplary example of the present invention.

The time from the supplying of the rotary insert core to the taking out of the molded product was set to 540 seconds. If high-precision molds with a desired shape were mounted on the rotary molding machine in the example, nine sets of such molds will be necessary. Further, the surface shape of the molded product having a shape similar to the desired shape obtained by the above-described process was measured. The maximum face-to-face distance from the desired face shape product was 0.1 mm. A result of measurement of birefringence of molding members of the present example molded by different mold temperatures is illustrated in FIG. 6. As can be seen from FIG. 6, the birefringence lowers as the mold temperature rises.

Similar to the first exemplary example, each molded product molded at each mold temperature and taken out was molded again by a secondary press apparatus 510. When the molded product was molded, the temperature of the insert core was set to 210° C. and a surface of lens was melted up to 0.2 mm in thickness on both the upper and lower faces of the lens. Further, pressure was applied and the optical element of the present example was obtained.

According to the present example, where nine sets of high precision molds are necessary if only the rotary molding is performed, only the high precision molds are needed for the two press units of the secondary press process. Thus the number of the high precision molds can be reduced.

Further, the optical element obtained according to the present example was formed into a desired shape and had a smaller refractive index distribution compared to a comparison example of a molded product manufactured by using polyolefin resin. Further, since the mold temperature of a primary press process can be set to a higher temperature, an optical element of smaller birefringence was obtained.

A configuration example of the above-described third exemplary embodiment will now be described as a third exemplary example. According to this example, a glass molded product is used for the rotary insert core described in the second exemplary example and a cutting trace removing process is provided between the discharge process and the pressing process. Since the present example is similar to the second example, descriptions of the overlapping points are not repeated, and only the different points will be described.

Similar to the second example, the resin was discharged on a rotary lower insert core which had been heated in advance at a heating station, and the rotary lower insert core formed by glass molding on which a cut resin was mounted was moved to the melt station by a conveyance robot. A 200 W mid-infrared lamp was provided on the melt station.

The rotary lower insert core, on which the cut resin is mounted, was moved closer to the mid-infrared lamp as the heating station was raised, and the cut portion of the resin was melted into an oval sphere by heating. Then, the rotary lower insert core with the molten resin was moved to the pressing-cooling unit. In the present example, the travel time from the melt station to the pressing-cooling unit was set to 60 seconds.

According to the present exemplary example, since there was no cutting trace and the surface was melted, the rotary lower insert core did not need to be maintained at the mold temperature, and the cooling was performed when the pressing was started. The mold temperature was set to 190° C. and pressing was started at a press load of 20 kgf. Further, the cooling was performed at 10° C./min. During the cooling, a constant pressure was applied until the mold was released. When the mold was cooled to 120° C., the body mold was opened and a molded product with a shape similar to the desired shape was taken out by a handling robot. The time from the supply of the rotary insert core to the taking out of the molded product was set to 480 seconds. Thus, eight pressing-cooling units were set on the rotary index.

The molded product which was taken out went under the secondary press process by a method similar to the method described in the second example and a molded product of the present example was obtained. According to the present example, since the melt station is provided, the manufacturing process of the primary press can be shortened. Accordingly, the unit can be simplified. Further, a molded product can be obtained by using glass similar to the second example. Thus, a rotary insert core can be manufactured in a simple manner.

A configuration example of the fourth exemplary embodiment will now be described as a fourth example. According to the fourth example, the secondary press process in the third example is performed by molding using quartz mold and an infrared lamp heating. Since the present example is similar to the third example, descriptions of the overlapping points are not repeated, and only the different points will be described.

Similar to the third example, a molding member obtained by the pressing-cooling process was set on a secondary press molding unit that uses infrared lamp heating. As a material of the upper and lower insert cores, a anhydrous quartz glass (ED-B: Tosoh Quartz Corporation) having a desired shape was used. When the positioning was finished, a lamp shutter was opened and light was emitted for 10 seconds. At the same time, a press load of 20 kgf was applied for 40 seconds. While the pressure was being applied, the lamp was continuously turned on for 10 seconds after the start of the application of the pressure. Then, the lamp shutter was closed for remaining 40 seconds. After the cooling was completed, the molded product of the present example was taken out and obtained.

According to the present example, where eight sets of high-precision molds are necessary when only the rotary molding is used, only one high-precision quartz mold is necessary for one press unit used in the secondary press process. Accordingly, the number of high-precision molds can be reduced. Further, the shape of the optical element obtained according to the present example had a desire shape. As a result of measurement, the refractive index distribution was 0.9×10-4 and birefringence was 53 nm. Compared to an injection molded product made of polyolefin resin manufactured as a comparison example, an optical element with small refractive index distribution was obtained.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-065806 filed Mar. 23, 2010, which is hereby incorporated by reference herein in its entirety.

What is claimed is:

1. A method of producing a plastic molded product comprising:

preparing at least one mold including a surface shape used for forming a final surface shape;

preparing a plurality of molds each having a lower degree of surface precision than the surface shape used for forming the final surface shape;

supplying molten resin to the plurality of molds having the lower degree of surface precession than the surface shape used for forming the final surface shape;

cooling the molds supplied with the molten resin for a predetermined length of time while pressure is being applied;

taking out, after the cooling, a molded member from at least one of the molds;

setting the molded member which is taken out in the mold having the surface shape used for forming the final surface shape; and melting a surface of the molded member which is set and pressing the surface shape used for forming the final surface shape against the surface of the molded member to form the plastic molded product.

2. The method of producing a plastic molded product according to claim 1, wherein the plastic molded product is an optical element.

3. The method of producing a plastic molded product according to claim 1, wherein the mold including the surface shape used for forming the final surface shape is made of infrared transmissive glass.

4. The method of producing a plastic molded product according to claim 1, wherein a shape error of the surface shape used for forming the final surface shape is equal to or less than 10 micrometers compared to a target surface shape.

5. The method of producing a plastic molded product according to claim 1, wherein the mold having the lower degree of surface precision than the surface shape used for forming the final surface shape has a shape error equal to or larger than 20 micrometers and equal to or less than 150 micrometers.

* * * * *

UNITED STATES PATENT AND TRADEMARK OFFICE
CERTIFICATE OF CORRECTION

| | |
|---|---|
| PATENT NO. | : 8,603,382 B2 |
| APPLICATION NO. | : 13/044755 |
| DATED | : December 10, 2013 |
| INVENTOR(S) | : Ogane et al. |

It is certified that error appears in the above-identified patent and that said Letters Patent is hereby corrected as shown below:

In the Title page, Item (73), after the word "Assignee:"

Delete "Canon Kasbushiki Kaisha" and insert instead -- CANON KABUSHIKI KAISHA --.

Signed and Sealed this
Seventh Day of October, 2014

Michelle K. Lee
*Deputy Director of the United States Patent and Trademark Office*